United States Patent [19]

Raghava

[11] 4,322,468
[45] Mar. 30, 1982

[54] ABRASION-RESISTANT DECORATIVE LAMINATES

[75] Inventor: Ram S. Raghava, Ann Arbor, Mich.

[73] Assignee: Formica Corporation, Wayne, N.J.

[21] Appl. No.: 202,043

[22] Filed: Oct. 30, 1980

Related U.S. Application Data

[63] Continuation-in-part of Ser. No. 46,143, Jun. 6, 1979, abandoned.

[51] Int. Cl.$^3$ .......................... B32B 3/00; B32B 5/16; B32B 27/08; B32B 29/04
[52] U.S. Cl. ................................. 428/204; 156/331.3; 427/372.2; 428/207; 428/208; 428/211; 428/525; 428/530; 428/535; 428/913; 525/58
[58] Field of Search ............... 428/195, 211, 525, 526, 428/530, 450, 323, 913, 524, 204, 207, 208, 535; 427/372.2; 525/58; 156/331.1, 331.3

[56] References Cited

U.S. PATENT DOCUMENTS

| | | | |
|---|---|---|---|
| 2,392,574 | 1/1946 | Brown | 428/525 X |
| 3,135,643 | 6/1964 | Michl | 428/525 X |
| 3,373,070 | 3/1968 | Fuerst | 428/530 X |
| 3,373,071 | 3/1968 | Fuerst | 428/525 X |
| 3,445,327 | 5/1969 | Fuerst | 428/450 |
| 3,563,844 | 2/1971 | Brown | 428/525 X |
| 3,928,706 | 12/1975 | Gibbons | 428/323 |

OTHER PUBLICATIONS

The Merk Index, 7th Ed., 1960, p. 834.

*Primary Examiner*—Thomas J. Herbert, Jr.
*Attorney, Agent, or Firm*—Paul W. Leuzzi, II

[57] ABSTRACT

Incorporating abrasive materials into the resin impregnated print sheet and thereafter applying a coating of a fully hydrolyzed polyvinyl alcohol modified melamine-formaldehyde resin results in an effective abrasion-resistant decorative laminate which eliminates the necessity for an overlay sheet containing abrasive materials and cellulosic fibers.

8 Claims, No Drawings

ABRASION-RESISTANT DECORATIVE LAMINATES

CROSS-REFERENCE TO RELATED APPLICATION

This application is a continuation-in-part application of application Ser. No. 46,143, filed June 6, 1978 now abandoned.

BACKGROUND

This invention generally relates to abrasion-resistant decorative laminates and methods of producing the same. More particularly, this invention relates to high-wear, no-overlay decorative laminates employing a fully hydrolyzed polyvinyl alcohol modified melamine-formaldehyde resin coating in place of an overlay sheet and incorporating abrasive materials in the print layer.

Conventionally, decorative laminates are made of three essential layers: a core layer, a print layer, and a surface layer. The core layer constitutes a bottom or supporting layer onto which the other layers are bonded. In normal high-pressure laminate manufacture the core layer consists of a plurality of cellulosic sheets. The core sheets are generally made from a kraft paper impregnated with a laminating resin. Laminating resins commonly used for the core layer include phenolic, amino, epoxy, polyester, silicone, and diallyl phthalate resins to name but a few. The industrially preferred laminating resin for decorative laminates appears to be a phenolic resin made from the reaction of phenols with formaldehyde. In low-pressure laminate manufacture the core layer is generally comprised of a sheet of particleboard ranging from ⅜" to 1" in thickness.

Placed above the core layer is the print layer which is generally an alpha cellulose pigmented paper containing a print, pattern, or design that has been impregnated with a melamine-formaldehyde resin. Typically, the printing is performed prior to impregnation by a high-speed rotogravure.

The cured melamine-formaldehyde resins are colorless and resistant to light; they are resistant to a variety of solvents and stains; and their heat resistance makes them immune to burning cigarettes, boiling water and heated containers up to about 325° F. Without these melamine-formaldehyde resins the decorative laminate industry would not exist as it is known today. However, because these resins are extremely brittle, they sometimes require reinforcement.

The surface layer, or overlay as it is commonly referred to, is a high-quality alpha cellulose paper impregnated with a melamine-formaldehyde resin. This layer protects the print sheet from external abuse such as abrasive wear and tear, harsh chemicals, burns, spills and the like. It is primarily the melamine-formaldehyde resin which accounts for these protective properties. The alpha-cellulose paper acts as a translucent carrier for water-thin resin, imparts strength to the rather brittle melamine-formaldehyde resin, maintains a uniform resin thickness in the overlay by acting as a shim, and controls resin flow.

The core layer, print layer and surface layer are stacked in a superimposed relationship, between polished steel plates and subjected to a pressure and temperature for a time sufficiently long enough to cure the laminating resins impregnating the respective layers. The elevated temperatures and pressure actually cause the impregnated resins within the sheets to flow which consolidates the whole into an integral mass, known as the laminate. These laminates find use as counter tops, table tops, furniture, store fixtures and the like.

Abrasive materials have previously been employed in the overlay in order to improve abrasion resistance. The abrasive materials are generally deposited upon the alpha cellulose matrix or, in other applications, mixed with cellulosic fibers or microcrystalline materials replacing the alpha cellulose sheet.

Employment of the overlay sheet has, however, generated a host of unwanted problems. The overlay contributes substantial material cost to the manufactured laminate. Not only are there raw material costs involved, such as expensive high-quality alpha cellulose paper and melamine-formaldehyde resins, but there exists substantial processing costs, such as collating sheets, scrap losses generated by the brittle and difficult-to-handle impregnated sheets, as well as the cost of impregnation itself. In addition to these unwanted expenditures and processing steps, the translucent character of the overlay sheet becomes visually disturbing in decorative laminates when, through the use of more advanced printing techniques, a sharper, more intricate design is employed.

Additionally, incorporation of abrasive materials in the overlay often results in severe damage to the delicate, highly polished or intricately etched surfaces of the press plates when the abrasive particles deposited in the overlay come into contact therewith.

Thus, there exists the need for substitution of the overlay sheet by a tough and transparent thermosetting layer that will eliminate haze or blur, incur fewer processing steps and lower costs, and yet maintain sufficient resistance to external abuse to be commercially acceptable. The provision for such a layer would fulfill a long-felt need and constitute a significant advance in the art.

SUMMARY OF THE INVENTION

The present invention provides for a laminate and its manufacture wherein abrasive materials are incorporated into the print layer which is subsequently coated with a protective layer comprising a fully hydrolyzed polyvinyl alcohol (PVA) modified melamine-formaldehyde resin. The coating layer replaces the conventional cellulosic overlay layer as the protective surface thereby providing substantial processing and cost savings in the manufacture of laminates. The abrasive particles incorporated into the print layer add the necessary abrasion resistance to the laminate to fulfill its wear-resistant requirements. In addition, the transparent nature of this resin provides for a clear and undistorted appearance of the print, pattern or design in the decorative laminate.

DETAILED DESCRIPTION OF THE INVENTION

In accordance with the present invention there is provided a heat-and-pressure consolidated laminate consisting essentially of, in superimposed relationship, a core layer comprised of a self-supporting substrate, a print layer consisting of an opaque alpha cellulose paper sheet impregnated with a melamine-formaldehyde thermoset resin and containing finely divided abrasive materials, and a surface coating of a fully hydrolyzed polyvinyl alcohol (PVA) modified melamine-formaldehyde resin wherein the surface coating weight is from about 40 to about 140 grams per square meter and the amount of fully hydrolyzed PVA in the surface coating is from about 5 to about 30 percent by weight of the total weight of the melamine-formaldehyde reaction product solids.

The fully hydrolyzed polyvinyl alcohol modified melamine-formaldehyde resin employed as the surface coating in the laminates of the present invention comprises the reaction product of melamine, formaldehyde and fully hydrolyzed polyvinyl alcohol wherein the molar ratio of melamine to formaldehyde is about 1:1 to about 1:3, respectively, and the fully hydrolyzed polyvinyl alcohol comprises from about 5 to about 30 percent by weight of the total weight of the melamine-formaldehyde reaction product solids.

The heat-and-pressure consolidated laminate of the present invention is produced according to the method which comprises positioning a laminate assembly between press plates, applying sufficient temperature and pressure to the laminate assembly to cure the resins impregnating the laminate assembly, thereby providing the decorative laminate, and recovering the resultant laminate.

The core layer of the laminate may contain either a plurality of sheets impregnated with a laminating resin or a commercially available pressed particleboard. In high-pressure laminates, the core layer is typically provided by a plurality of impregnated sheets. These sheets can be varied in their nature in accordance with the particular properties desired in the decorative laminate. Typically, the core layer is made from paper, woven fabrics, mats, felts, or the like. Paper is by far the most widely used and thus constitutes the preferred stock for the core layer in high-pressure laminates. More particularly, a kraft paper of about a 60 to about a 130 pound basis weight per 3000 square foot ream is preferred as the stock from which the core layer sheets are prepared for high-pressure laminates because of its strong, cheap and plentiful nature. In low-pressure laminates, a particleboard of from about ⅜ to about 1 inch in thickness is preferred as the self-supporting substrate comprising the core layer. Suitable particleboards are commercially available in plentiful quantities at moderate cost.

The laminating resins used for impregnating the sheets of the core layer can be any of those thermosetting resins discussed above. In particular, it is preferable to employ an alkaline catalyzed phenol-formaldehyde condensation product as the laminating resin employed in the core layer. These resins can be purchased commercially or prepared according to conventional procedures.

The alpha cellulose sheet used in the print layer of the laminate generally runs from about 50 to about 120 pound basis weight per 3000 square foot ream. Either the sheet is of a particular solid color or upon this alpha cellulose sheet is displayed a print, pattern or design suitable for the intended use of the laminate. The decorative print, pattern or design is typically applied by a high-speed rotogravure before the sheet is impregnated with the melamine-formaldehyde resin. Recently, photogravure reproductions of natural materials such as wood, marble, and leather have been applied to these alpha cellulose sheets as well. Typically, a three-ink system is employed with the alpha cellulose sheet itself being highly pigmented to provide a fourth color as background and as an opaque base by which the core layer is accordingly obscured. Although printing can be accomplished at any time prior to impregnation of the melamine-formaldehyde resin, printing is often done immediately before the impregnation. Printing houses make available, for those laminators not equipped with printing equipment, already printed alpha cellulose paper of various prints, patterns, designs, or colors.

Suitable melamine-formaldehyde resins for impregnation of the print layer are prepared by reacting melamine with formaldehyde in an aqueous dispersion or solution. The mole ratio of the melamine to formaldehyde may be varied from about 1:1 to about 1:3, respectively. It is preferred that the mole ratio be controlled from about 1:1.3 to about 1:2, melamine to formaldehyde, respectively. The reaction occurs under alkaline conditions at a temperature ranging from about 70° to the reflux temperature until a clear reaction product is obtained.

The finely divided abrasive materials which lend to the laminate increased abrasion resistance may be incorporated into the alpha cellulose sheet in various methods. For example, the abrasive material may be added in the pulper or in the head box during the paper-making process. This method causes uniform distribution of the abrasive particles throughout the sheet, the individual sheet fibers holding the particles through the formation of a matrix network around each particle. Additionally, the abrasive material may be added to the impregnating thermosetting resin. In this latter approach, a thin layer of abrasive particles is deposited on the surface of the opaque alpha cellulose paper during impregnation. In both instances the abrasive materials become an integral part of the print layer. The abrasive material may be incorporated in the fully hydrolyzed PVA modified melamine-formaldehyde coating as well, thereby imparting abrasive resistance to the laminate; but, again, this can damage a polished press plate.

Suitable abrasive materials should be clear, highly translucent materials with a refractive index which is substantially identical to that of the thermosetting resin. Such materials include, but are not limited to, silica, silicates, glass fibers, clear asbestos, quartz, corundum, alumina, and other suitable natural or synthetic abrasive materials. Preferably, finely divided silica having particles ranging in size up to 40 microns with an average size of approximately 5 to 10 microns are employed. The abrasive material added constitutes approximately 10 to 20 percent by weight of the impregnating melamine-formaldehyde thermosetting resin, preferably about 15 percent by weight of said resin.

The fully hydrolyzed PVA modified melamine-formaldehyde resin used as a coating over the print layer not only obviates the need for an overlay sheet but provides a high-wear, clear, craze-free decorative laminate that is aesthetically more pleasing. The polyvinyl alcohol is employed as a plasticizer with considerable ductility whose particles in the brittle matrix of the melamine-formaldehyde resin provide for a toughening of the thus-modified resin. The fully hydrolyzed PVA is required over the partially hydrolyzed PVA for use in the melamine-formaldehyde resin because the partially hydrolyzed PVA modified melamine-formaldehyde has exhibited too short of a shelf-life (time lapse before gelation) for practical purposes, even when stabilizers such as o,p-toluene sulfonamide have been added. Fully hydrolyzed PVA is commercially available for use in the present invention. The fully hydrolyzed PVA employed in the coating layer generally will not be prepared by hydrolysis of polyvinyl alcohols in the conventional manner. Instead, the fully hydrolyzed PVA is the product of fully hydrolyzing a polyvinyl ester, such as polyvinyl acetate or polyvinyl formate. This procedure is more efficient, less costly, and results in a polyvinyl alcohol having a degree of hydrolysis equal to or greater than about 99.0 percent of the acetate groups on a dry basis. However, the term "fully hydrolyzed PVA" is generally recognized in the trade to apply to this highly hydrolyzed polyvinyl ester, and as such will continue to be applied herein.

In preparing the fully hydrolyzed PVA modified melamine-formaldehyde resin of the present invention, the first stage in the preparation of this coating is the reaction between melamine and formaldehyde. Although, the fully hydrolyzed PVA may be added after the reaction of the melamine and formaldehyde, it is preferrable to add the fully hydrolyzed PVA to the initial stage. The mole ratio of melamine to formaldehyde can be varied from about 1:1 to about 1:3, respectively. The reaction is to be carried out in an aqueous dispersion or solution. To facilitate this aqueous phase reaction, aqueous formaldehyde solutions commercially available are usually employed in the preparation of the modified resin.

The reaction between melamine and formaldehyde should occur under alkaline conditions. The preferred pH range of the reaction is 7.5 to 10. For this purpose, a buffering material to control the pH is traditionally employed. One such buffering agent that may be advantageously used is triethanolamine, although the present invention is not limited to this particular buffering material. The buffering agent may be employed during the initial stages of the reaction, during both the initial stage and the modification stage, or not at all.

During the initial stage of the melamine-formaldehyde reaction, the reaction temperature is not critical although lower temperatures, such as room temperature, cause the reaction to progress rather slowly. At this point, the fully hydrolyzed PVA is added to the reaction. The amount of fully hydrolyzed PVA to be employed may vary from about 5% to 30% on a weight basis of the total weight of the melamine-formaldehyde reaction product solids. It is generally preferred, however, that the fully hydrolyzed PVA added be in an amount of from about 10% to 20% on a weight basis of the total weight of the melamine-formaldehyde reaction product solids. It is likewise preferred that during the reaction between the fully hydrolyzed PVA and the melamine-formaldehyde resin, a reaction temperature ranging from about 70° C. to the reflux temperature should be maintained, preferably about 80° C. to 90° C. The reaction should continue until the percent water tolerance of the reaction ranges from about 300% to about 500% in 5° C. water. The expression, percent water tolerance, is a well-known term in the resin art and simply means that a sample of resin can be diluted in a certain percent of its volume without displaying any milkiness, i.e. 300% water tolerance at 5° C. indicates that the given sample can be diluted in three times its volume of 5° C. water without displaying any milkiness. After the reaction product has reached the desired endpoint, it is cooled to ambient temperature and stored for coating use. If the resin produced is not viscous enough for coating purposes and penetrates the print paper during subsequent coating operations a small amount of a thickening agent, such as carboxyl methyl cellulose, sodium alginate or the like may be added with the other constituents during the reaction to correct this result. Additionally, stabilizers such as o,p-toluene sulfonamide may be added to extend the shelf life of the resin coating.

The fully hydrolyzed PVA modified melamine-formaldehyde resin is coated upon the print layer to a weight of from about 40 to about 140 grams per square meter, preferably about 70 to about 120 grams per square meter. The coating operation may be performed by a knife coater, reverse roll coater, or similar technique. The preferred coating process is the knife coater wherein the knife and resin dam are mounted on a roller. Adjustment of the gap between the print sheet and the knife coater varies the coating thickness to its desired amount. The coating operation may be a separate operation or part of the impregnation operation. As a separate operation, the print sheet is first impregnated with a melamine-formaldehyde resin and subsequently dried before the coating operation is commenced. As part of the impregnation operation coating is performed on the wet print sheet immediately subsequent to impregnation on a single apparatus. In the present invention a combination of these two methods is preferred wherein the entire impregnation and coating processes are performed on a single apparatus which is provided with the means to impart a partial drying to the wet print sheet subsequent to impregnation yet prior to coating, preferably by passing the impregnated print sheet through a hot air oven before the coating operation. After coating, the print sheet undergoes a terminal drying operation in which the coated print sheet is dried to a volatile content of from about 4% to about 9%, preferably about 6%. The terminal drying imparts upon the coated print sheet the necessary flow characteristics for good bonding to take place in the subsequent heat-pressing operation.

A preferred process for manufacturing a high-pressure laminate of the present invention is one in which 3 to 9 core sheets consisting of 6–20 mil. kraft paper have been impregnated with a 30% to 60% solution of phenol-formaldehyde resin so that the final resin solids content of the core sheets is about 20% to about 40% of the total weight of the core. Typically, these core sheets are oven dried after impregnation for a period of about one to two minutes at temperatures ranging from 140° C. to 170° C. The print layer consisting of a 50 to 120 pound basis weight per 3,000 square foot ream alpha cellulose pigmented sheet, which will have an abrasive material previously incorporated in the sheet itself and optionally displaying a color, print, pattern, or design is impregnated with the malamine-formaldehyde resin so that the final resin solids content of the print sheet is from about 10% to about 40% of the print sheet, then partially dried, coated on its print bearing side with a fully hydrolyzed PVA modified melamine-formaldehyde resin and then terminally dried. The sheets are then stacked such that the print sheet is the top most sheet with its print bearing and coated side facing outward. The stacked sheets are placed between polished stainless steel plates upon which there is exerted a pressure of from about 800 to 1600 psi at temperatures from about 120° C. to 180° C. for approximately 20 minutes to effect the cure and thereby provide the high-pressure laminate.

A preferred process for manufacturing a low-pressure laminate of the present invention is one in which a pressed particleboard of from about ⅝ to about 1 inch has stacked above it, in a manner identical to that employed in the high-pressure laminate, the print sheet. Said print sheet being identical to the one employed in the high-pressure laminate discussed above. The stack is placed between polished stainless steel plates upon which there is exerted a pressure of from about 200 to about 600 psi at temperatures from 120° C. to about 180° C. for approximately 20 minutes to effect the cure and thereby provide the low-pressure laminate.

The press plates employed in either high-pressure or low-pressure laminate may be texturized such that the plate surface has protuberant and valley areas capable of being impressed into the uppermost of said print layer. This would allow for a migration of the surface coating resin from the areas corresponding to the protuberant areas of the press plate to the areas corresponding to the valley areas of the press plate. Such a migration would result in a decorative laminate exhibiting embossed areas of contrasting color when the surface coating resin is pigmented.

The following specific examples illustrate certain aspects of the present invention and, more particularly, point out methods of evaluating the unique advantages the decorative laminate of the present invention provides. However, the examples are set forth for illustration only and are not to be construed as limitations on the present invention except as set forth in the appended claims. All parts and percentages are by weight unless otherwise specified.

COMPARATIVE EXAMPLE A

A commercially available kraft paper is impregnated with a conventional phenol-formaldehyde laminating resin to a resin content of 29%. The impregnated paper is then dried to a volatile content of 6.0 and cut into sheets of suitable size. Five such sheets are assembled together to form a core layer.

An opaque alpha cellulose print paper is impregnated with a conventional melamine-formaldehyde resin to 40% resin solids. The print paper is then passed through a hot-air oven to effect drying of the impregnated sheet. The dry print sheet is then coated with a fully hydrolyzed PVA modified melamine-formaldehyde resin by a knife coater. The coating weight of the resinous layer is 88 grams per square meter. The coated print paper is dried to a 6.0% volatile content and cut into sheets of suitable size.

This coated print paper is then laid upon the laminate core with the coated side facing upwardly. The entire assembly is then pressed between polished stainless steel plates at 145° C. and 1400 psi. The pressed laminate is cooled and removed from the press. Test results of the laminate's physical properties are given in Table I.

EXAMPLE 1

The procedure of Comparative Example A is followed in every material detail except that finely divided silica of 325 mesh is added to the melamine-formaldehyde resin before impregnating the print layer. The silica constitutes 15% by weight of the melamine-formaldehyde resin. Test results of the laminate's physical properties are given in Table I.

COMPARATIVE EXAMPLE B

The procedure of Comparative Example A is followed in every material detail except that immediately after the print layer is impregnated with the conventional melamine-formaldehyde resin it is coated, by a knife coater, with a layer of the fully hydrolyzed PVA modified melamine-formaldehyde resin, no prior drying having been effectuated. Test results of the laminate's physical properties are given in Table I.

EXAMPLE 2

The procedure of Comparative Example B is followed in every material detail except that finely divided silica of 325 mesh is added to the melamine-formaldehyde resin impregnating the print layer. The silica constitutes 15% by weight of the melamine-formaldehyde resin. Test results are given in Table I.

EXAMPLE 3

The procedure of Comparative Example A is followed in every material detail except that the opaque alpha cellulose print paper contains silica particles. The silica particles of 325 mesh are added to the paper during the manufacturing processes so that the cellulose fibers entrap the silica particles. The amount of silica is such that it equals 15% by weight of the melamine-formaldehyde resin which is later impregnated into the print layer. Additionally, the print layer is impregnated with conventional melamine-formaldehyde to 48% resin solids. Test results are given in Table I.

TABLE I

| | ABRASION RESISTANCE | |
|---|---|---|
| Example | NEMA Test #3-301 Abrasion Wear: Cycles | NEMA Test #3-301 Abrasion Wear: gram/100 Cycles |
| Comparative A | 350 | 0.07 |
| 1* | 527 | 0.032 |
| Comparative B | 350 | 0.07 |
| 2* | 443 | 0.04 |
| 3* | 600 | 0.012 |

*No evidence of plate scratching despite presence of silica particles.

EXAMPLE 4

When the procedure of Example 1 is followed in every material detail except that calcium silicate is employed as the abrasive material in an amount equal to 10% by weight of the melamine-formaldehyde resin, substantially equivalent results are obtained.

EXAMPLE 5

When the procedure of Example 1 is followed in every material detail except that glass fibers are employed as the abrasive material in an amount equal to 20% by weight of the melamine-formaldehyde resin, substantially equivalent results are obtained.

EXAMPLE 6

When the procedure of Example 1 is followed in every material detail except that alumina is employed as the abrasive material in an amount equal to 15% by weight of the melamine-formaldehyde resin, substantially equivalent results are obtained.

EXAMPLES 7-12

When the procedure of Examples 1-6 are followed in every material detail except that a ½ inch pressed particleboard constitutes the core layer and the pressing pressure and temperature are 300 psi and 145° C. respectively, a low-pressure laminate of excellent surface abrasion resistance is obtained.

I claim:

1. A heat and pressure consolidated laminate consisting essentially of, in superimposed relationship, (a) a core layer consisting of a self-supporting substrate;

(b) a print layer consisting of an opaque alpha cellulose paper sheet impregnated with a melamine-formaldehyde thermoset resin and containing finely divided abrasive materials; and (c) a surface coating located upon the print layer of a hydrolyzed polyvinyl alcohol having a degree of hydrolysis equal to or greater than about 99.0 percent of the acetate groups modified melamine-formaldehyde resin wherein the surface coating weight is from about 40 to 140 grams per square meter and the amount of hydrolyzed polyvinyl alcohol in the surface coating is from about 5 to 30 percent by weight of the total weight of the melamine-formaldehyde reaction product solids.

2. The laminate of claim 1 wherein the core layer comprises a plurality of kraft paper sheets impregnated with an alkaline catalyzed phenol-formaldehyde condensation product.

3. The laminate of claim 1 wherein the finely divided abrasive material is silica.

4. The laminate of claim 1 wherein the hydrolyzed polyvinyl alcohol modified melamine-formaldehyde resin comprises the reaction product of melamine, formaldehyde and hydrolyzed polyvinyl alcohol having a degree of hydrolysis equal to or greater than 99.0 percent of the acetate groups wherein the molar ratio of melamine to formaldehyde is about 1:1 to about 1:3, respectively.

5. The laminate of claim 1 wherein the amount of formaldehyde employed in the surface coating resin is from about 1.3 to about 2.0 moles per mole of melamine employed.

6. The laminate of claim 1 wherein the amount of hydrolyzed polyvinyl alcohol employed is in the range of from about 10 to about 20 percent by weight of the total weight of the melamine-formaldehyde reaction product solids.

7. The laminate of claim 1 wherein the hydrolyzed polyvinyl alcohol modified melamine-formaldehyde surface coating weight is from about 70 to about 120 grams per square meter.

8. A method of producing a heat and pressure consolidated laminate of claim 1 which comprises:

(a) positioning a laminate assembly between press plates wherein said laminate assembly consists essentially of, in superimposed relationship, (1) a core layer consisting of a self-supporting substrate;

(2) a print layer consisting of an opaque alpha cellulose paper sheet impregnated with a melamine-formaldehyde thermoset resin and containing finely divided abrasive materials; and (3) a surface coating of a hydrolyzed polyvinyl alcohol having a degree of hydrolysis equal to or greater than about 99.0 percent of the acetate groups modified melamine-formaldehyde resin wherein the surface coating weight is from about 40 to 140 grams per square meter and the amount of hydrolyzed polyvinyl alcohol in the surface coating is from about 5 to 30 percent by weight of the total weight of the melamine-formaldehyde reaction product solids, (b) applying sufficient temperature and pressure to the laminate assembly to cure the resins impregnating the laminate assembly, thereby providing the consolidated laminate; and (c) recovering the resultant consolidated laminate.

* * * * *